Aug. 27, 1968     O. M. STUETZER     3,398,685

ION DRAG PUMPS

Filed Sept. 11, 1961     2 Sheets-Sheet 1

*INVENTOR.*
OTMAR M. STUETZER

BY

ATTORNEY

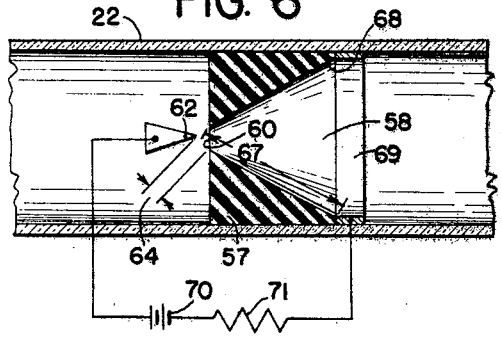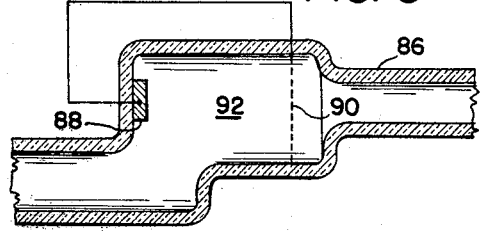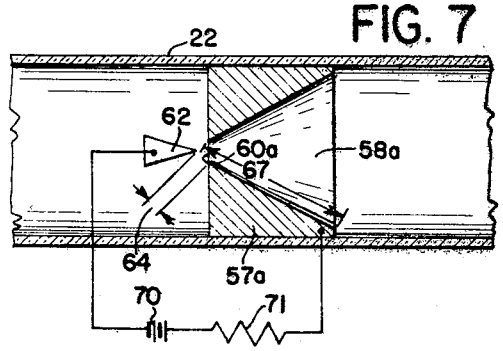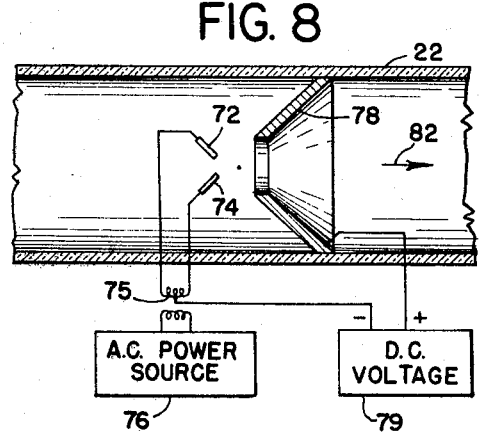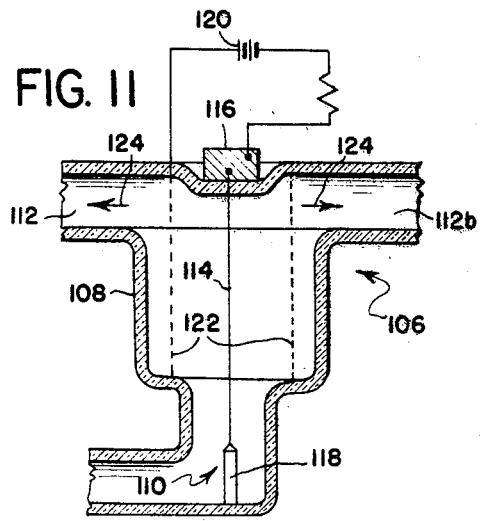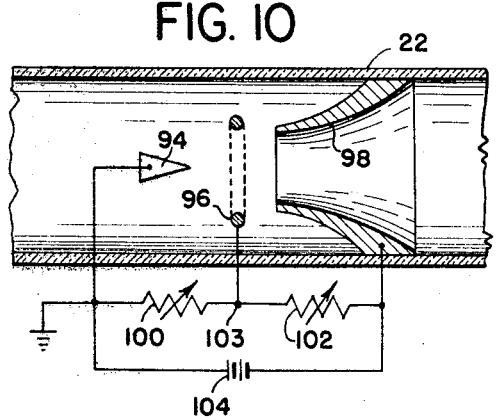

United States Patent Office 3,398,685
Patented Aug. 27, 1968

3,398,685
ION DRAG PUMPS
Otmar M. Stuetzer, Hopkins, Minn., assignor, by mesne assignments, to Litton Systems, Inc., Beverly Hills, Calif., a corporation of Maryland
Continuation-in-part of application Ser. No. 795,996, Feb. 27, 1959. This application Sept. 11, 1961, Ser. No. 137,086
10 Claims. (Cl. 103—1)

The present invention relates to pumps. More specifically, it pertains to efficient pumps having no moving parts especially suited for continuously pumping insulating liquids and gases. This application is a continuation-in-part of co-pending application Ser. No. 795,996 filed Feb. 27, 1959.

Some pumps without any moving parts are presently available for propelling conducting fluids. These pumps make use of magnetic fields in order to effect movement of the conducting fluid therethrough. A disadvantage of such pumps is that they cannot be used to propel nonconducting or insulating fluids which do not contain magnetic impurities.

Accordingly, one object of the present invention is to provide a pump involving no moving parts and especially suited for continuously circulating pure nonconducting fluids.

Another object of this invention is to provide a pump involving no moving parts for pumping insulating liquids by means of a strong electric field.

A further object of this invention is to provide a pump for insulating liquids in which ions or particles charged by ions or electrons moving through said liquid drag molecules of said liquid with them.

A still further object of this invention is to provide a pump with no moving parts in which a high field strength is developed in a small volume of the dielectric to be pumped.

Other objects and advantages of the invention will be apparent from the following description in which certain preferred embodiments of the invention are disclosed.

According to the present invention, the desired objects can be accomplished by establishing a high field strength by either an alternating or direct current potential in a given volume of liquid which it is desired to pump, increasing the number of ions in the liquid or injecting electrons into the liquid, forming a pump space within the volume of liquid shaped in such a way that the product of a "shape factor" times the square of the field strength obtainable is at a maximum. The ions or electrons under the influence of the electric field exert drag forces on the surrounding liquid molecules and move the molecules, i.e., friction between the ions or electrons and the molecules of the liquid transfers momentum to the molecules and causes them to move. By this method liquids such as silicone oil, kerosene and gasoline can be pumped by apparatus having no moving parts.

In the drawings which form a part of this application,

FIG. 6 is a side elevational view, in section, of another modification of the pumping elements embodying a cylindrically shaped insulating member having a cone portion cut therefrom;

FIG. 7 is a side elevational view, in section, of a modification utilizing as an electrode a cylindrical member having a conical portion removed therefrom;

FIG. 8 is a side elevational view, in section, of still another modification of the various elements forming the pumping section of the present invention;

FIG. 9 is a side elevational view, in section, illustrating means for injecting electrons into the pumping portion of the present invention;

FIG. 10 shows, in a sectional view, another modification of the present invention; and FIG. 11 is a side elevational view, in section, of a cyclindrically shaped embodiment of the present invention.

Figure 1:
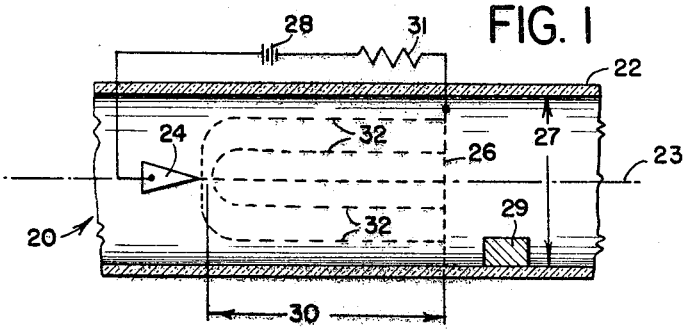
FIGURE 1 is a side elevational view, in section, depicting one embodiment of the present invention.

In the embodiment shown in FIG. 1, an ion drag pump 20 includes a circular insulating tube 22 which provides a longitudinal flow path having an axis 23 and a cross-sectional area A (not shown). Positioned in the tube 22 is an emitting electrode 24 and a smooth collecting electrode 26 which are spaced apart by a distance 30. The collecting electrode 26 has a diameter 27. Also positioned within the tube 22 is an absorbent material 29 such as charcoal or silica gel, which tends to eliminate toxic gases that might be created in the tube 22 by corona discharge between the electrodes 24 and 26. The emitting electrode 24 can be shaped as a sharp point, a blade, or a ring, although an electrode having a sharp portion thereon is preferred, while the collecting electrode 26 can be a normal grid, ring or cone. A D.C. voltage source 28 and a resistor 31 are positioned in circuit between the emitting electrode 24 and the collecting electrode 26.

It has been found that the pressure build-up between the electrodes 24 and 26 when a voltage source 28 is connected therebetween can be represented by $p$ (pressure) =

$$\frac{j \text{ (current density)} \times \text{length 30 of pumping space}}{b \text{ (mobility of the conduction ions)}}$$

With the voltage source 28 connected as shown in FIG. 1 current flows between the electrodes 24 and 26 in paths depicted by numerals 32. The current paths 32 have a tendency toward parallel flow which is believed to be caused by space and surface charges. With the electrode distance 30 sufficiently large compared to the diameter or width 27 of the collecting electrode 26, the following analytical expression results:

$$P = \frac{I.X_1}{A.b} \approx \frac{9}{8}\epsilon\frac{(V-V_0)^2}{X_1^2} \quad (2)$$

where $P$=pressure difference between electrode 24 and electrode 26
$I$=current caused by voltage 28 to flow between electrodes 24 and 26
$X_1$=distance depicted by numeral 30
$A$=cross-sectional area of the tube 22
$b$=mobility of the conduction ions in the material to be pumped
$V_0$=the threshold voltage necessary to get a corona discharge started
$V$=the voltage impressed between the electrodes 24 and 26
$\epsilon$=the dielectric constant of the material within the tube 22

$$\frac{V-V_0}{X_1}=\text{field strength}$$

The middle portion $$\left(\frac{I \cdot X_1}{A \cdot b}\right)$$

of Equation (2) is true all the time, while the right hand portion $$\left(\frac{9}{8}\epsilon\frac{(V-V_0)^2}{X_1^2}\right)$$

holds true only if no surface charges accumulate on the walls of the tube 22 to interfere with the applied electric field.

Whenever the pumping material is uniform and clean enough, thus making sudden breakthroughs unlikely, the distance 30 should be very small e.g., about equal to the largest cross-sectional dimension of the tube 22 or less.

It has been found that for best operation the threshold value, $V_0$, should be kept as small as possible. This necessitates very sharp emitter points or edges for the electrode 24. Such construction unfortunately limits the lifetime of the emitters 24 used for pumping liquids which have a comparatively high mobility, $b$, i.e., liquids which permit large currents to be drawn through the emitter. (Examples of such liquids are air, silicone oil, and impure gasoline.) Good engineering compromise requires duller edges in cases where the liquid to be pumped has a high mobility.

To pump a liquid placed in the tube 22, a high strength electric field is established between electrodes 24 and 26 when they are connected to the voltage source 28. The operation thereafter of the structure shown in FIGURE 1 is believed to be as follows. With the formation of the above-mentioned field, electrons are injected into the liquid in the pump space between said electrodes 24 and 26 from one of the electrodes. These electrons increase the number of ions present in the liquid located between the electrodes 24 and 26 by ionizing a small percent of the liquid. The ions thus formed are accelerated by the electric field and under its effect move in one relative direction. As they move, these ions frictionally engage molecules of the liquid between the electrodes 24 and 26. Due to friction between the ions and the molecules, the molecules are dragged in one relative direction approximately parallel to the lines of force of the electric field, thus imparting momentum and movement to the liquid in that relative direction.

The voltage applied to the electrodes 24 and 26 should be sufficient to induce corona discharge therebetween, but be less than that which would cause a spark to appear in the particular insulating liquid between the electrodes.

In operation, where the distance 30 is kept small, alternating current (AC) power can be used for pumping. To do this, care must be taken in the design of the pump so the ion transit time, T, which is $$T=\frac{4}{3b}\cdot\frac{X_1^2}{V-V_0} \qquad (3)$$

is smaller than the duration of the AC half-cycle.

Figure 3:
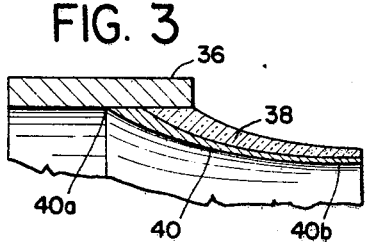
FIG. 3 is a modification of one of the electrodes shown in FIG. 2.
Figure 2:
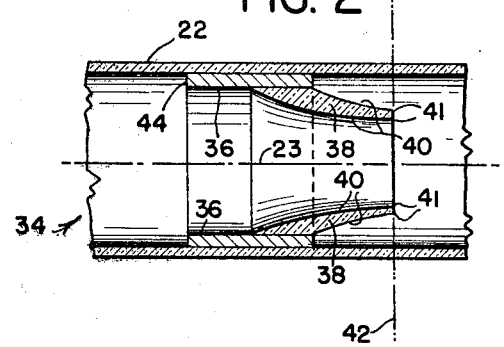
FIG. 2 is a side elevational view, in section, of an element which is used to make up another embodiment of the present invention.

FIGURE 2 depicts, in a side sectional elevational view, a modified form 34 of both the emitter electrode and the collecting electrode. The modified electrode 34 has a metal sleeve 36 with well rounded edges, which is snugly positioned within the tube 22. Connected to the metal sleeve 36 is a flow-constricting glass insert 38 which is coated with a very thin layer of metal 40 such as gold or nickel. The layer 40 can be modified so as to vary in thickness, being thicker on one end 40$a$ and thinner on the other end 40$b$ (FIG. 3). The layer of metal 40 makes electrical contact with the metal sleeve 36. In a plane 42 which is perpendicular to the longitudinal axis 23 of the tube 22, the coating 40 is ground off thereby providing very sharp emitting edges 41.

With electrodes constructed along the lines of FIG. 3, a uniform field can be established along the axis of the tube 22. This has some advantages in that corona discharge points, i.e., emitter electrodes, have a tendency to focus field, current, and hence pressure in the direction of their axis of symmetry.

Figure 4:
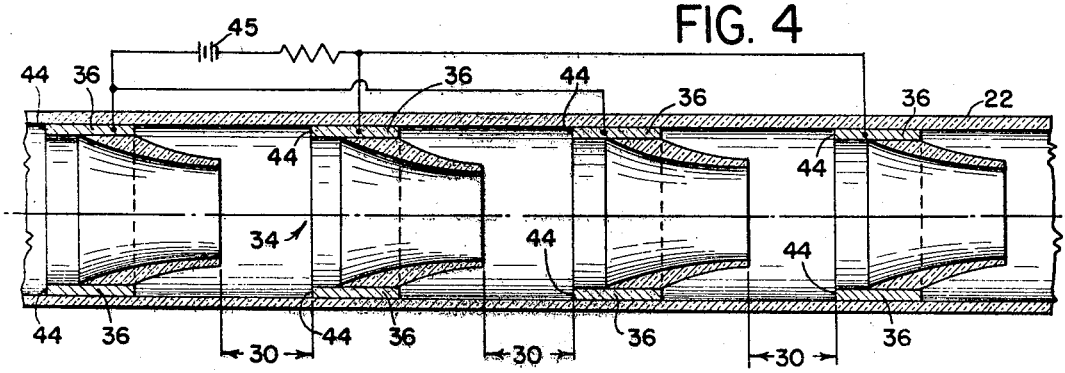
FIG. 4 is a side elevational view, in section, of a series of the electrodes shown in FIG. 2.

As can be seen from FIG. 4, electrodes like 34 can be cascaded into a series of collecting and emitting electrodes. In such an arrangement the blunt side 44 of each ring or sleeve 36 acts as the collecting or catcher electrode for the previous emitter electrode. Every other ring 36 is, in turn, connected to either the positive or negative potential of a direct current (DC) source 45. Thus it will be seen that pump elements such as 34 can be cascaded or placed in series to provide pressure equal to the number of stages so positioned times the pressure provided by a single pump stage. By stage is meant a pumping element having both an emitting and collecting electrode. Each stage pumps in much the same manner as explained with reference to FIG. 1.

Figure 5:
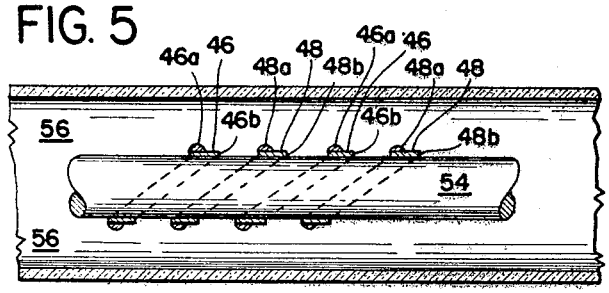
FIG. 5 is a side elevational view, in section, of an embodiment of the present invention in which the electrodes are positioned in a spiral arrangement.

FIG. 5 shows another modification of the present invention which consists of a parallel connection of conductor elements 46 and 48 positioned in a spiral arrangement. The electrical elements 46 and 48 are spirally wrapped around an insulating cylinder 54 which is positioned inside the insulating tube 22. The elements 46 and 48 have edges 46$a$ and 48$a$ which are blunted by covering them with smooth half round wire and edges 46$b$ and 48$b$ which in their preferred form are sharp. The edges 46$b$ and 48$b$ function as emitter electrodes, while the edges 46$a$ and 48$a$ perform as collector electrodes. Between the cylinder 54 and the tube 22 is a pumping space 56.

By making either the element 46 or 48 positive and the other element negative, pumping of a nonconducting fluid in the space 56 can be accomplished as explained for the embodiment shown in FIG. 1 by establishing a high strength electric field between elements 46 and 48.

FIG. 6 is a side elevational view, in section, of another modification of the pumping element. Fitted in the tube 22 is a cylindrically shaped, flow-constricting member 57 having a portion removed therefrom to provide a frustoconical inner surface 58 having an opening 60 at its apex. At a distance 64 from the apex opening 60, an electrode 62 is positioned. At an end 68 of the insulating insert 57 is placed a collector electrode 69, which may be molded into the constricting insert 57 if desired. The collector electrode 69 is located at a distance 67 from the emitting electrode 62. As in the case shown in FIG. 1, a voltage source 70 and a resistor 71 are connected in circuit with the emitting electrode 62 and the collecting electrode 69.

In operation it has been found that a pump constructed as shown in FIG. 6 will provide a pressure difference between the two electrodes 62 and 69 in accordance with the following formula:

$$P=\frac{3}{8}\epsilon\left[\frac{V-V_0}{X_1}\right]^2\cdot\left[\left(\frac{X_1}{X_0}\right)-1\right] \qquad (4)$$

where $\epsilon$, $V$, $V_0$ are as defined for Equation 2 and
$X_1$=distance depicted by numeral 67
$X_0$=distance depicted by numeral 64

It has also been found, contrary to A. P. Chattuck's theory (see Phil. Mag., vol. 48, p. 401 (1899)), that the immediate environment of the corona discharge point 62 does make an important contribution to the pressure build-up.

As can be readily realized by examining the foregoing formula, the pressure differential is directly proportional to both the square of the field strength $$\left(\frac{V-V_0}{X_1}\right)$$

of the material being pumped and the shape factor, $$\left[\left(\frac{X_1}{X_0}\right)-1\right]$$

of the pump. It would thus appear that by increasing the last mentioned ratio, one could obtain a very high amount of pressure with the pumping element shown in FIG. 6. Unfortunately if the distance 64 ($X_0$) is made too small, the maximum field strength tolerated by the liquid or gas is adversely affected and number of ions created decreases. Therefore, in order to obtain the maximum pressure in any specific sized structure built like FIG. 6 for a given material, there must be a correlation between the field strength factor $$\left(\frac{V-V_0}{X_1}\right)^2$$

and the shape factor $$\left[\left(\frac{X_1}{X_0}\right)-1\right]$$

The optimum pressure depends on the electric properties and the viscosity of the gas or liquid to be pumped. This balance is obtained by providing the maximum product when the two factors are multiplied together.

FIG. 7 illustrates a modification which is similar to that shown in FIG. 6 but differs therefrom in several important respects. First, the electrode 69 shown in FIG. 6 is eliminated. Secondly, the cylindrical insulating insert 57 is replaced by a similarly shaped conducting insert 57a having a frusto-conical inner surface 58a with an opening 60a at its apex. The pointed electrode 62 is spaced from the opening 60a by a distance 64, as in the embodiment of FIG. 6. Also, the voltage source 70 and resistor 71 are connected in series between the emitter electrode 62 and the insert 57a, which thus serves as the collector electrode.

Th pump shown in FIG. 7 operates in substantially the same manner as the embodiments previously described. However, if the differential pressure formula (Equation (4)) is applied to that embodiment, it is seen that $X_1$ varies over the length of the frusto-conical surface 58a. In other words, the factor ($X_1/X_0$) varies from unity upwardly. It has been found in practice that the particular configuration shown in FIG. 7 provides pumping action that is considerably superior to that of the other embodiments previously described when the field strength factor and the shape factor are properly balanced.

FIG. 8 shows another modification of various elements to form an ion drag pump in accordance with the invention. In this particular modification, two emitter electrodes 72 and 74 are positioned inside the insulating tube 22 and connected through a transformer 75 to a high current source 76 such as an A.C. source of 2000 volts. A collector electrode 78 which is also positioned within the tube 22 is biased by a high voltage source 79 at a different potential than that at which the electrodes 72 and 74 are maintained. The collector electrode 78 also serves to constrict the flow and can be shaped to either follow what would be the outside surface of a cone or a wedge. A further modification of the pump of FIG. 8 would be to have only one emitter electrode centrally positioned in the tube 22 instead of the two electrodes 72 and 74.

In general with the collector electrode 78 at a different potential than the emitter electrodes 72 and 74, ions will be created in the fluid contained in the tube 22 and will move between the emitter electrodes and the collector electrode. As an example of a type of source that can be used, the source 79 can provide a D.C. voltage which gives the collector electrode 78 a positive potential of 20,000 volts with respect to the emitter electrodes 72 and 74. At the same time, the A.C. power source 76 can impress an alternating voltage of 2,000 volts on electrodes 72 and 74. It has been found that an A.C. power source for the electrodes 72, 74 gives the most ions per watt, but this source could also be D.C. Negative ions created by electrons from emitters 72 and 74 would be drawn towards the collector 78. The friction between these negative ions and the other molecules of the insulating fluid positioned in the tube causes the liquid to move in the direction indicated by the arrow 82.

FIG. 9 illustrates an embodiment incorporating means for injecting electrons into the liquid which it is desired to pump. In this particular arrangement, a tube 86 of insulating material is provided with a piece of radioactive material 88 and a collector electrode 90 which are electrically connected by wire 92. This arrangement does not need a voltage source.

If a powerful enough radioactive material 88 is used, the energy of the ejected alpha particles or electrons can be used to pump the fluid 92. These particles travel to the collector electrode 90 and friction between the travelling particles and the molecules of the fluid 92 causes the molecules to be drawn toward the collector electrode 90.

FIG. 10 shows, in a sectional view, another modification of the pumping element which, in this embodiment, consists of a three-electrode configuration positioned within the tube 22. The three elements are an emitter electrode 94, a grid or auxiliary electrode 96, and a flow-constricting collector electrode 98. In series between the emitter 94 and the grid 96 is a variable resistor 100, and in series with the grid 96 and the collector 98 is another variable resistor 102. The two resistors 100 and 102 have a common junction 103 where they are connected to the grid 96. A voltage source 104 is connected across the resistors 100 and 102.

It has been found that with the electrode 96 substantially at the potential of the emitter 94, i.e., with the resistor 100 being very small relative to the resistor 102, one obtains higher pressures than without the grid 96, at the cost of power efficiency. With the electrode 96 substantially at the potential of the collector 98, i.e., with the resistor 102 being very small, compared to the resistor 100, one obtains better efficiency at the cost of pressure. It thus appears that resistors 100 and 102 should be adjusted according to the technical requirements, i.e., whether one desires high efficiency or high pressure.

FIG. 11 is a cross sectional view of a cylindrical pumping element 106 having an outer cylindrical body portion 108 with an inlet 110 and two outlets 112 and 112b. In the cylindrical body portion 108 is positioned a thin wire emitter 114. One end of the wire 114 is connected to an emitter electrode 116 which is secured to the top of the body portion 108 and the other end is held by an insulating post 118. The insulating post 118 is fastened near the inlet 110. A voltage source 120 is connected between the emitting electrode 116 and a cylindrically shaped collecting electrode 122 which is positioned in the cylindrical body member 108 substantially co-axially with the wire 114.

In operation this cylindrical pumping element 106 works in essentially the same manner as that described for the element of FIG. 1. That is, the electrons emitted by the wire 114 ionize a small percentage of the molecules of the fluid contained in the body portion 108. These ions are accelerated when attracted to the collecting electrodes 122. The interaction between these accelerated ions and the molecules of the fluid in the body 108 tend to draw the molecules of said fluid toward the cylindrical electrode 122. Thus the fluid contained in the pumping element 106 is pumped radially away from the emitting wire 114 and out the outlets 112 and 112b in the direction of the arrows 124.

The following is an example of the pressure obtainable in an insulating liquid with pumps constructed in accordance with the teachings herein disclosed. With a pump constructed as shown in FIG. 5 with $X=9$ mm., $X_0=1$ mm., tube diameter=6 mm., and $V=27$ kv., an insulating silicone oil available commercially from Dow Chemical Corporation under the trade name of "Silicone 550" was pumped to a pressure of 225 mm. of water. With V increased to 36 kv., the pressure increased to approximately 484 mm. of water.

It will be noted that in some of the figures, the emitter electrode is shown as connected to the positive side of the voltage source, while in others it is shown connected to the negative side. Either arrangement is operable, although it has been found in practice that making the emitter negative with respect to the collector provides the most efficient pumping action.

In view of the principles and teachings set forth herein, some of the ways of carrying out the present invention and some of the equivalents which are suggested by these disclosures have been shown. Many other modifications will doubtless occur to one skilled in the art.

I claim:

1. Apparatus for continuously pumping an insulating liquid comprising an elongated tubular shaped housing, a solid cold emitter electrode positioned in said housing, a collector electrode spaced downstream from said emitter electrode a distance no greater than the largest internal cross-sectional dimension of said housing, flow constricting means in said housing forming a constricted opening adjacent the downstream end of said emitter electrode, said means defining a flow path which is divergent from said constricted opening in the downstream direction therefrom, and means connected between said electrodes to establish ionization and a high field strength in the liquid between said electrodes and between the ends of said divergent flow path.

2. Apparatus as defined in claim 1, wherein said flow constricting means is an insulating member.

3. Apparatus for continuously pumping an insulating liquid comprising an elongated housing, a solid cold emitter electrode positioned in said housing and having a sharp portion thereon, a collector electrode spaced downstream from said emitter electrode a distance no greater than the largest internal cross-sectional dimension of said housing, flow constricting means in said housing forming a constricted opening adjacent the downstream end of said emitter electrode, means forming a frustoconically shaped flow path which is divergent from said constricted opening in the downstream direction therefrom, and means connected between said electrodes to establish ionization and a high field strength in the liquid between said electrodes and between the ends of said frustoconically shaped flow path.

4. Apparatus for continuously pumping an insulating liquid comprising an elongated tubular shaped housing, emitter electrode means positioned in said housing, flow constricting means positioned downstream from said emitter electrode means for constricting the flow of the liquid, said flow constricting means having a flow path which is divergent in the downstream direction from said emitter electrode means, and means for connecting said emitter electrode means and said flow constricting means to a voltage source to establish ionization and a high field strength in the liquid therebetween and between the ends of said divergent flow path.

5. Apparatus as defined in claim 4, wherein said emitter electrode means comprises two electrodes for connection to opposite sides of an alternating current source.

6. Apparatus as defined in claim 4, wherein said flow constricting means comprises a solid member having a portion removed to provide an inner surface having a smaller opening nearest said emitter electrode means and a larger opening farthest from said emitter electrode means.

7. Apparatus as defined in claim 4, wherein said flow constricting means is a conductive member which also serves as a collector electrode.

8. Apparatus as defined in claim 6, wherein said inner surface has a frusto-conical shape.

9. Apparatus as defined in claim 6, wherein said flow constricting means is a conductive member which also serves as a collector electrode.

10. Apparatus as defined in claim 8, wherein said flow constricting means is a conductive member which also serves as a collector electrode.

References Cited

UNITED STATES PATENTS

| | | | |
|---|---|---|---|
| 2,600,129 | 6/1952 | Richards | 103—1 |
| 2,862,099 | 11/1958 | Gage | 60—202 |
| 3,022,430 | 2/1962 | Brown | 103—1 |
| 3,041,824 | 7/1962 | Berhman | 60—202 |
| 3,071,705 | 1/1963 | Coleman | 103—1 |
| 1,980,521 | 11/1934 | Hahn | 230—69 X |
| 2,182,751 | 12/1939 | Reitherman | 230—69 |
| 2,279,586 | 4/1942 | Bennett | 230—69 |
| 2,525,347 | 10/1950 | Gilman | 103—1 |
| 2,600,129 | 6/1952 | Richards | 103—1 |
| 2,765,975 | 10/1956 | Lindenblad | 230—69 |
| 2,809,314 | 10/1957 | Herb | 103—1 |
| 2,851,618 | 9/1958 | Krawinkel | 103—1 X |
| 2,880,337 | 3/1959 | Langmuir et al. | 103—1 |

FOREIGN PATENTS

| | | |
|---|---|---|
| 116,125 | 2/1958 | Russia. |
| 1,246,669 | 10/1960 | France. |

ROBERT M. WALKER, *Primary Examiner.*